3,156,739
MANUFACTURE OF OLEFINS
Leopold Horner and Hellmut Hoffmann, Mainz (Rhine), and Walter Klink, Worms - Pfiffligheim, Germany, assignors to Farbwerke Hoechst Aktiengesellschaft vormals Meister Lucius & Brüning, Frankfurt am Main, Germany, a corporation of Germany
No Drawing. Filed May 16, 1961, Ser. No. 110,346
Claims priority, application Germany, July 12, 1960, F 31,635
12 Claims. (Cl. 260—668)

The present invention relates to a process for the manufacture of olefins from bis-phosphine oxides or bis-phosphonic acid esters and aldehydes or ketones.

We have found that olefins can be produced in a simple manner by reacting bis-phosphine oxides or bis-phosphonic acid esters of the general formula

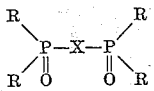

wherein R represents an alkyl or aryl radical which may be attached to the phosphorus atom by means of an oxygen atom and X represents a bivalent, saturated or unsaturated aliphatic radical which may be interrupted by bivalent aromatic radicals, and which carries at least one hydrogen atom at the carbon atoms in α-position to the phosphorus atoms, with aldehydes or ketones in the presence of an alkali metal alcoholate or an alkali metal amide.

As starting materials there may be used on the one hand bisphosphine oxides or bisphosphonates, for example, 1,2-ethane-bis-diphenylphosphine oxide, or 1,2-ethane-bis-phosphonic acid tetraalkylester, 1,4-butane-bis-diphenylphosphine oxide or 1,4-butane-bis-phosphonic acid tetraalkylester, 1,6-hexane-bis-diphenylphosphine oxide or 1,6-hexane-bis-phosphonic acid tetraalkylester, 1,4-butene-(2)-bis-diphenylphosphine oxide or 1,4-butene-(2)-bis-phosphonic acid tetraalkyl ester and xylylene-bis-diphenylphosphine oxide or xylylene-bis-phosphonic acid tetraalkyl ester and similar compounds; on the other hand there may be used aldehydes, for example, butyraldehyde, isobutyraldehyde, enanthaldehyde, benzaldehyde, cinnamaldehyde, diphenyl-4-aldehyde, naphthaldehyde, pyridinaldehyde, phenanthrenaldehyde, anthracenaldehyde and ketones, for example, methyl-ethyl-ketone, methylisopropylketone, acetophenone, butyrophenone, benzophenone, benzil, fluorenone, and cyclohexanone.

The process for this invention proceeds according to the following scheme of reaction which describes the reaction of 1,2-ethane-bis-diphenylphosphine oxide with benzophenone.

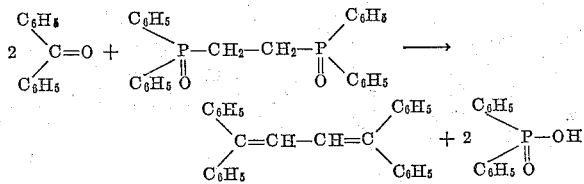

The process of the present invention permits forming two C=C-double bonds in one process step and thus the formation of oligo olefins.

The reaction process is advantageously carried out as follows: A solution of bis-phosphine oxide or bis-phosphonic acid ester and a carbonyl compound in an inert solvent is added, while stirring mechanically, to a suspension or solution of an alkaline condensing agent which is preferably used in excess, and the reaction mixture is heated for some time.

When using carbonyl compounds having a methylene group in the α-position the condensing agent is preferably first allowed to react on the bis-phosphine oxide or the bis-phosphonic acid ester, whereby an excess of the condensing agent should be avoided, and the solution is then added to a carbonyl compound.

It is of advantage to carry out the reaction in a nitrogen atmosphere and with the exclusion of moisture.

As examples of inert solvents there may be mentioned those organic solvents that do not contain acidic hydrogen atoms, the preferred solvents being aromatic hydrocarbons, such as benzene, toluene or xylene. Aliphatic or cycloaliphatic hydrocarbons, such as petroleum ether, white spirit, cyclohexane etc. may also be used. Care should be taken that the solvent used is a fairly good solvent for the reaction components. Solvents other than those specified above may also be used, for example ethers, such an anisol.

By varying the proportions of the reactants it becomes possible to replace only one phosphine oxide group or one phosphonic acid ester group by the radical of a carbonyl compound.

When reacting, for example, hexamethylene-1,6-bis-diphenylphosphine oxide with benzophenone and potassium-tert.-butylate at a molar ratio of bis-phosphine oxide:butylate of 1:1 or 1:2, there are obtained about 16% of the theoretical yield of 1-(7,7-diphenyl-heptenyl-6)-diphenyl phosphine oxide and about 36% of the theoretical yield of 1,1,8,8,-tetraphenyl-octadiene-(1,7) or 32% of the theoretical yield of 1-(7,7-diphenyl-heptenyl-6)-diphenyl phosphine oxide and about 35% of the theoretical yield of 1,1,8,8-tetraphenyl-octadiene-(1,7), respectively, whereas at a molar ratio of bis-phosphine oxide:butylate of 1:4, there is obtained substantially 1,1,8,8-tetraphenyl-octadiene-(1,7).

As condensing agents there may be used alkali metal alcoholates such as sodium methylate, sodium ethylate, sodium isopropylate, sodium-tert.-amylate and the corresponding potassium compounds, especially potassium-tert.-butylate, as well as alkali metal amides, such as sodium amide and potassium amide and the N-substitution products thereof, for example, potassium diethylamine and the like.

The reaction time and the reaction temperatures may vary within wide limits. The reaction is advantageously carried out at temperatures ranging between about 50° C. and about 200° C., preferably between 80° C. and 150° C. Generally, the reaction is carried out at the reflux temperature of the solvent used. Under these conditions the reaction time amounts to about 3–20 hours. When the reaction mixture is not stirred by mechanical means, longer reaction times are required in order to obtain satisfactory yields.

The process of the present invention shows the following advantages as compared with the known processes for preparing olefins.

The bis-phosphine oxides and bis-phosphonic acid esters used as starting substances can be prepared in an easy and economic way and the condensation with the carbonyl compounds leads to the desired olefin in one single process step.

The yields obtained according to the process of the present invention are superior to those obtained according to the known processes and can be compared with the yields obtained when preparing olefins from phosphine alkylenes and carbonyl compounds. As compared with the last mentioned method the process of the present invention offers the advantage that the phosphorus-containing starting materials used are cheaper in price and that the phosphinic or phosphoric acids formed as by-products can easily be separated from the final products.

The products obtained according to the process of the present invention serve as scintillators and can be used as optical brighteners.

The following examples serve to illustrate the invention but they are not intended to limit it thereto:

EXAMPLE 1

*1,4-Bis-(Diphenyl-Ethenyl)-Benzene From Para-Xylylene - Bis-Phosphonic-Acid-Tetraethylester and Benzophenone*

(a) 2.1 g. of ester, 1.9 g. of benzophenone and 2.5 g. of potassium-tert.-butylate were heated under nitrogen in toluene for 48 hours under reflux.

A strongly greenish fluorescent solution was obtained which was admixed with dilute acetic acid; both phases were separated, the organic phase was evaporated and 0.9 g. of a greenish fluorescent substance were obtained which melted at 193–194° C. The yield was 37% of the theory.

(b) 2.4 g. of potassium-tert.-butylate were suspended in about 50 cc. of toluene and heated to 130° C. on the oil bath. The toluene became completely clear. The above solution of the ester (2.1 grams) and the benzophenone (1.9 grams) in 20 cc. of toluene was added dropwise and the mixture was heated for 9 hours under reflux. The reaction mixture was then boiled for half an hour with dilute acetic acid and the layers were separated. The phosphate thus formed could be detected in the aqueous phase. After removing the toluene under reduced pressure, the organic phase left a solid residue, which crystallized from glacial acetic acid in greenish fluorescent needles which melted at 193–194° C. The yield was 1.5 g. (62% of the theory). The mixed melting point with the hydrocarbon obtained according to the above mentioned process shows no depression.

EXAMPLE 2

*1,4-Bis-(4-Phenylbutadienyl)-Benzene From Para-Xylylene-Bis-Phosphonic Acid Tetraethylester and Cinnamic Aldehyde*

4.2 g. of ester and 2.9 g. of cinnamic aldehyde (freshly distilled) dissolved in 20 cc. of toluene were added dropwise to a solution of 5.4 g. of potassium-tert.-butylate in about 50 cc. of toluene at an oil bath temperature of 130 °C. An orange yellow precipitate was formed immediately. In order to complete the reaction, the mixture was heated for a further 7 hours. After adding dilute acetic acid the precipitate became yellow. Phosphate could be detected in the aqueous phase. The substance obtained after removing the solvent melted at 288° C. after recrystallization and crystallized in yellow fluorescent leaflets. The yield was 3.7 g. (84% of the theory).

EXAMPLE 3

*2,2'-Bis - (Pentamethylene)-Para - Divinylbenzene From Para-Xylylene-Bis-Phosphonic Acid Tetraethylester and Cyclohexanone*

The solution of 5.5 g. of ester and 2.5 g. of cyclohexanone in 30 cc. of toluene was added dropwise to a mixture of 5.5 g. of potassium-tert.-butylate and toluene which was heated at 130° C. After 8 hours, dilute acetic acid was added and the whole was worked up as described before. After distilling off the toluene in vacuo, there remained an oil which crystallized when triturated with alcohol and which melted at 90–91° C. after recrystallization from alcohol. The yield was 2.5 g. (65% of the theory).

EXAMPLE 4

*1,4-Bis-(1,9-Phenanthryl-Ethenyl)-Benzene From Para-Xylylene-Bis-Phosphonic Acid Tetra-Ethylester and Phenanthrene-9-Aldehyde*

3.64 g. of ester and 3.95 g. of aldehyde were dissolved in 50 cc. of toluene and added dropwise to a suspension of 4.3 g. of potassium-tert.-butylate in toluene which was heated at 130° C. on an oil bath. A yellow precipitate was formed immediately. The mixture was heated for a further 6 hours and filtered after the addition of dilute acetic acid. Phosphate could be detected in the aqueous solution. The residue obtained after working up the organic phase was recrystillized together with the precipitate from xylene in the presence of traces of iodine and melted at 257–258° C. The yield was 3 g. (75% of theory). The substance fluoresced green-yellowish.

EXAMPLE 5

*1,4-Bis-(9-Anthranyl-Ethenyl)-Benzene From Para-Xylylene-Bis-Phosphonic Acid-Tetra-Ethylester and Anthracene-9-Aldehyde*

3.7 g. of potassium-tert.-butylate were suspended in toluene and heated at 130° C. After a little more than half of the solution of 3.1 g. of ester and 3.4 g. of aldehyde in 40 cc. of toluene was added dropwise to the potassium-tert.-butylate solution, there precipitated a product of red orange coloration. The reaction mixture was maintained for about 8 hours at 130° C. The crude yield of the precipitate was 3 g. (76% of the theory). The compound melted at 317–319° C. After recrystallization from dimethylformamide the compound melted at 319–320° C. (literature: 320–322° C.). When worked up with the dilute acetic acid as described above, phosphate could be detected in the aqueous phase. The substance crystallized from dimethylformamide in orange red leaflets, which brightened in the light.

EXAMPLE 6

*1,4-Bis-(4-Biphenyl-1-Ethenyl)-Benzene From Para-Xylylene-Bis-Phosphonic Acid-Tetra-Ethyl Ester and Diphenyl-4-Aldehyde*

2.8 g. of potassium-tert.-butylate were suspended in about 50 cc. of toluene, heated at 130° C. on the oil bath and then added to a solution of 2.36 g. of ester and 2.2 g. of aldehyde in 30 cc. of toluene. A yellow precipitate separted immediately. After heating for about 8 hours at 130° C. and after adding dilute acetic acid to the reaction mixture, the precipitate was filtered off. The organic phase was evaporated under reduced pressure and the residue thus obtained was combined with the precipitate. The yield was about 3 g.

The 1,4-bis-(4-biphenyl-1-ethenyl)-benzene was insoluble in xylene-dimethylformamide and glacial acetic acid and melted only above 370° C. The substance was purified by sublimation in a high vacuum at 320–340° C. under a pressure of 0.003 mm. of mercury. Phosphate could be detected in the aqueous phase.

EXAMPLE 7

*1,4-Bis-(Distyryl)-Benzene From Para-Xylylene-Bis-Phosphonic Acid Tetra-Ethyl Ester and Benzaldehyde*

8.1 g. of potassium-tert.-butylate were dissolved in toluene and the solution of 6.9 g. of ester and 3.8 g. of benzaldehyde in 50 cc. of toluene were added at 60° C. When adding the solution the temperature of the oil bath was gradually raised to 130° C. After boiling for about 8 hours under reflux, the reaction mixture fluoresced and crystals had separated. After adding dilute acetic acid green fluorescent leaflets separated which melted at 265–266° C. when recrystallized from benzene (about 300 cc.) (melting point indicated in the literature: 265–266° C. and 268° C.). Phosphate could be detected in the aqueous phase. The yield was 3.5 g. (69% of the theory).

EXAMPLE 8

*1,1,6,6-Tetraphenyl-Hexatriene-1,3,5 From 1,4-Butene-2-Bis-Phosphonic Acid-Tetra-Ethylester and Benzophenone*

4.7 g. of potassium-tert.-butylate were introduced into toluene, and the solution of 3.5 g. of ester and 3.8 g. of benzophenone in 40 cc. of toluene was added slowly and dropwise to the potassium-tert.-butylate solution which was heated at about 60° C. on the oil bath. The solution turned orange, then red orange and later on became more and more dark. After 9 hours, dilute acetic acid was added, both layers were separated and the organic phase was evaporated under reduced pressure after being dried over sodium sulfate. After the recrystallization of the yellow residue from xylene in the presence of traces of iodine there were otained 2.5 g. (61% of theory) of the above mentioned hexatriene which melted at 192–196° C. Phosphate could be detected in the aqueous phase.

EXAMPLE 9

*1-10-Diphenyl-Deca-Pentaene-1,3,5,7,9 From 1,4-Butene-2-Bis-Phosphonic Acid Tetra-Ethylester and Cinnamic Aldehyde*

The solution of 4.2 g. of cinnamic aldehyde and 5.2 g. of ester in 30 cc. of toluene was added dropwise at about 60° C. to a suspension of 7.1 g. of potassium-tert.-butylate in about 50 cc. of toluene. The reaction mixture first turned red orange and then became more and more dark. After some time orange yellow leaflets separated from the red brown solution. After boiling for 6 hours under reflux dilute acetic acid was added, the precipitate was filtered, the layers were separated and the reaction mixture was worked up as described before. The yield was 0.9 g. (20% of the theory). The orange yellow leaflets melted at 253° C.

EXAMPLE 10

*1,4-Bis-(4-Phenyl-Butadienyl) Benzene From Para-Xylylene-Bis-Diphenyl-Phosphine Oxide and Cinnamic Aldehyde*

2.8 g. of bis-phosphine oxide and 2.5 g. of potassium-tert.-butylate were heated in about 50 cc. of toluene at an oil bath temperature of about 130° C. until the solution had become clear, while simultaneously turning yellow. 1.5 g. of cinnamic aldehyde which were diluted with 40 cc. of toluene were added dropwise whereby a yellow precipitate separated immediately. After heating for 9 hours, water was added and the two layers were separated.

On acidifying the aqueous phase with hydrochloric acid there were obtained 2.5 g. of impure diphenylphosphinic acid, which melted at 160–180° C.

The yield of 1,4-bis-(4-phenyl-butadienyl)-benzene was 500 mg. (22% of the theory). Melting point 288° C.

EXAMPLE 11

*1,1,4,4-Tetraphenyl-Butadiene-1,3 From Ethylene-1,2-Bis-Diphenyl-Phosphine Oxide and Benzophenone*

2.75 g. of bis-phosphine oxide, 2.5 g. of benzophenone and 3.0 g. of potassium-tert.-butylate were mixed and heated for 9 hours in 50 cc. of toluene at an oil bath temperature of 130° C. The color of the reaction mixture changed from yellow over orange to red orange. After some time, a colorless precipitate separated and the color of the mixture brightened. The aqueous phase was worked up and 2.6 g. (89% of the theory) of diphenyl phosphinic acid which melted at 191–193° C. were obtained. The residue obtained after the evaporation of the organic phase was combined with the precipitate and both were recrystallized from glacial acetic acid. There was obtained 1 g. (41% of theory) of white needles of fluorescent violet coloration, which melted at 195–196° C.

EXAMPLE 12

*Hexamethylene-1,6-Bis-Diphenylphosphine Oxide and Benzophenone*

(*a*) 7.9 g. of bis-phosphine oxide and 7.3 g. of potassium-tert.-butylate were heated under reflux (180° C. oil bath temperature) in 50 cc. of white spirit, while stirring and passing nitrogen through the mixture until a complete solution had been obtained. A solution of 5.9 g. of benzophenone in 30 cc. of white spirit was added dropwise. After adding half of the benzophenone, the solution became viscous and a precipitate separated. The reaction mixture was heated under reflux for a further 6 hours and then mixed with about 100 cc. of water. After separating the two layers and acidifying the aqueous phase with concentrated hydrochloric acid there were obtained 5.7 g. (80% of the theory) of diphenylphosphinic acid which melted at 190–192° C.

On cooling, there crystallized from the organic phase 1.1 g. of a substance which melted at 185–192° C. A mixed melting point with hexamethylene-1,6-diphenyl-phosphine oxide showed only a slight depression. These products were impure starting products.

After distilling of the remaining solvent in vacuo on the water bath, a residue was obtained, which crystallized after being triturated with ethanol. When recrystallized from ethanol there were obtained 1.7 g. of 1,1,8,8-tetraphenyl-octadiene-1,7 which melted at 94–95° C., corresponding to a yield of 25%, calculated on the bisphosphine oxide used.

(*b*) 6.5 g. of bisphosphine oxide and 3.8 g. of potassium-tert.-butylate were heated in 50 cc. of white spirit, while stirring and passing purified nitrogen through the solution, until the solution had become homogeneous while simultaneously turning yellow. 4.9 g. of benzophenone dissolved in 50 cc. of white spirit were added dropwise. After a reaction time of 8 hours there were added 100 cc. of water to the violet solution and the whole was boiled for a short time. 4.7 g. (81% of the theory) of diphenyl-phosphinic acid, which melted at 190–192° C. were obtained from the aqueous phase.

When cooling the organic phase there crystallized a colorless substance which contained phosphorus and which decolorized bromine in a solution of carbon tetrachloride. An unsaturated phosphine oxide, i.e., 1-(7,7-diphenyl-heptenyl-6)-diphenyl-phosphine oxide, was isolated by filtration in a yield of 1.9 g. (32% of the theory). The substance melted at 118–119° C. when recrystallized from acetone.

The filtrate was evaporated in vacuo and the remaining oil solidified in crystalline form when triturated with ethanol. The yellowish crystals, obtained after recrystallization from ethanol, decolorized bromine in a solution of carbon tetrachloride, and melted at 94–95° C. The yield of 1,1,8,8-tetraphenyl-octadiene-1,7 was 2 g. (35% of theory calculated on the total quantity of the bis-phosphine oxide used).

(*c*) 12.2 g. of bis-phosphine oxide and 2.8 g. of potassium-tert.-butylate were heated for 1 hour under reflux at 180° C. in 50 cc. of white spirit while stirring and passing purified nitrogen through the mixture, and a solution of 4.6 g. of benzophenone in 30 cc. of white spirit was added. After 7 hours, 100 cc. of water were added to the reaction mixture and the whole was boiled for a short time. When cooling the diphase reaction mixture, crystals separated immediately.

After filtration, these crystals were boiled with acetone in order to separate the mono-olefinated phosphine oxide from the unreacted starting material. 7.0 g. (57% of theory) were recovered unchanged.

0.8 g. of 1-(7,7-diphenyl-heptenyl-6)-diphenyl phosphine oxide, which melted at 115° C. crystallized immediately from acetone.

After removal of the white spirit in vacuo and after triturating the residue with alcohol, there were obtained 1.6 g. of 1,1,8,8-tetra-phenyloctadiene-1,7, which melted at 94–95° C. After acidifying the aqueous layer, there were obtained 3.3 g. of diphenyl phosphinic acid which melted at 188–192° C.

(*d*) 6 g. of bis-phosphine oxide, 4.7 g. of benzophenone and 5.8 g. of potassium-tert.-butylate (molar ratio 1:2:4) were mixed and 40 cc. of toluene were added under an atmosphere of nitrogen while stirring. When subsequently heating the solution at 130° C. on the oil bath the reaction mixture changed its color from yellow orange over violet orange to brown and a precipitate was formed.

After 9 hours, water was added and the two layers were separated.

When acidifying the aqueous phase there were obtained 4.7 g. (89% of theory) of a colorless precipitate of diphenyl-phosphinic acid which melted at 191–192° C.

The evaporation being finished, the organic phase left a yellow oil which crystallized when triturated with ethanol.

When recrystallized from ethanol there were obtained 3.4 g. (67% of theory) of 1,1,8,8-tetraphenyl-octadiene-1,7 which melted at 92–93° C.

EXAMPLE 13

*Tetramethylene-1,4-Bis-Diphenyl-Phosphine Oxide and Benzophenone*

6.1 g. of tetramethylene-1,4-bis-diphenyl-phosphine oxide and 4.15 g. of potassium-tert.-butylate were boiled under reflux for half an hour in 50 cc. of white spirit while stirring and passing purified nitrogen through the mixture. A solution of 5.4 g. of benzophenone in 30 cc. of white spirit was slowly added dropwise and the color of the solution turned green to violet. The addition being finished, the mixture was boiled under reflux for a further 7 hours and 100 cc. of water were added. On cooling, a mixture of substances precipitated which could be separated into two substances by treatment with ether.

The substance which was insoluble in ether melted at 169–170° C. after recrystallization from dimethylformamide and was identical with 1-(5,5-diphenylpentenyl-4)-diphenyl phosphine oxide.

The yield was 2.1 g. (37% of theory) calculated on the total quantity of the bisphosphine oxide used.

The substance which was soluble in ether was added to the organic phase and the whole was worked up. After distilling off the mixture of white spirit and ether in vacuo there remained a residue which melted at 121–122° C. after recrystallization from ethanol. The yield of 1,1,6,6-tetraphenylhexadiene-1,5 was 1.3 g. (25% of theory) calculated on the total quantity of the bisphosphine oxide used.

When acidifying the aqueous phase there were obtained 4.2 g. (72% of theory) of diphenylphosphinic acid which melted at 192–193° C.

We claim:

1. A process for the manufacture of olefins which comprises reacting a member selected from the group consisting of cyclohexanone, fluorenone and carbonyl compounds of the formula:

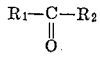

in which $R_1$ represents a member selected from the group consisting of alkyl, alkenyl, aralkyl, aralkenyl, hydrocarbon aryl, and pyridyl radicals and $R_2$ represents a member selected from the group consisting of hydrogen, acyl, alkyl, alkenyl, aralkyl, aralkenyl, and hydrocarbon aryl radicals, in the presence of a condensation agent selected from the group consisting of alkali metal alkoxides and alkali metal amides, with a member selected from the group consisting of the compounds of the formula:

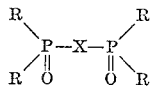

wherein each R represents a member selected from the group consisting of alkyl, alkoxy, hydrocarbon aryl and hydrocarbon aryl oxy, and X represents a member selected from the group consisting of alkylene radicals containing 2 to 6 carbon atoms, alkenylene radicals containing 2 to 4 carbon atoms and xylylene radicals.

2. The process of claim 1, wherein the reaction components are used in equivalent amounts.

3. The process of claim 1, wherein the reaction is carried out in an inert solvent.

4. The process of claim 1, wherein the reaction is carried out in an aromatic hydrocarbon.

5. The process of claim 1, wherein the reaction is carried out in a cycloaliphatic hydrocarbon.

6. The process of claim 1, wherein the reaction is carried out at a raised temperature.

7. The process of claim 1, wherein the reaction is carried out at a temperature in the range of between about 50° C. and about 200° C.

8. The process of claim 1, wherein the reaction is carried out at a temperature in the range of between about 80° C. and about 150° C.

9. The process of claim 1, wherein the condensation agent is an alkali metal alkoxide containing 1 to 5 carbon atoms.

10. The process of claim 1, wherein the condensation agent is potassium-tert.-butoxide.

11. The process of claim 1, wherein the condensation agent is the potassium amide.

12. The process of claim 1, wherein the condensation agent is the sodium amide.

No references cited.